A. H. C. GIBSON.
POWER TRANSMISSION MECHANISM.
APPLICATION FILED DEC. 27, 1916.
1,293,641.
Patented Feb. 4, 1919.
3 SHEETS—SHEET 2.
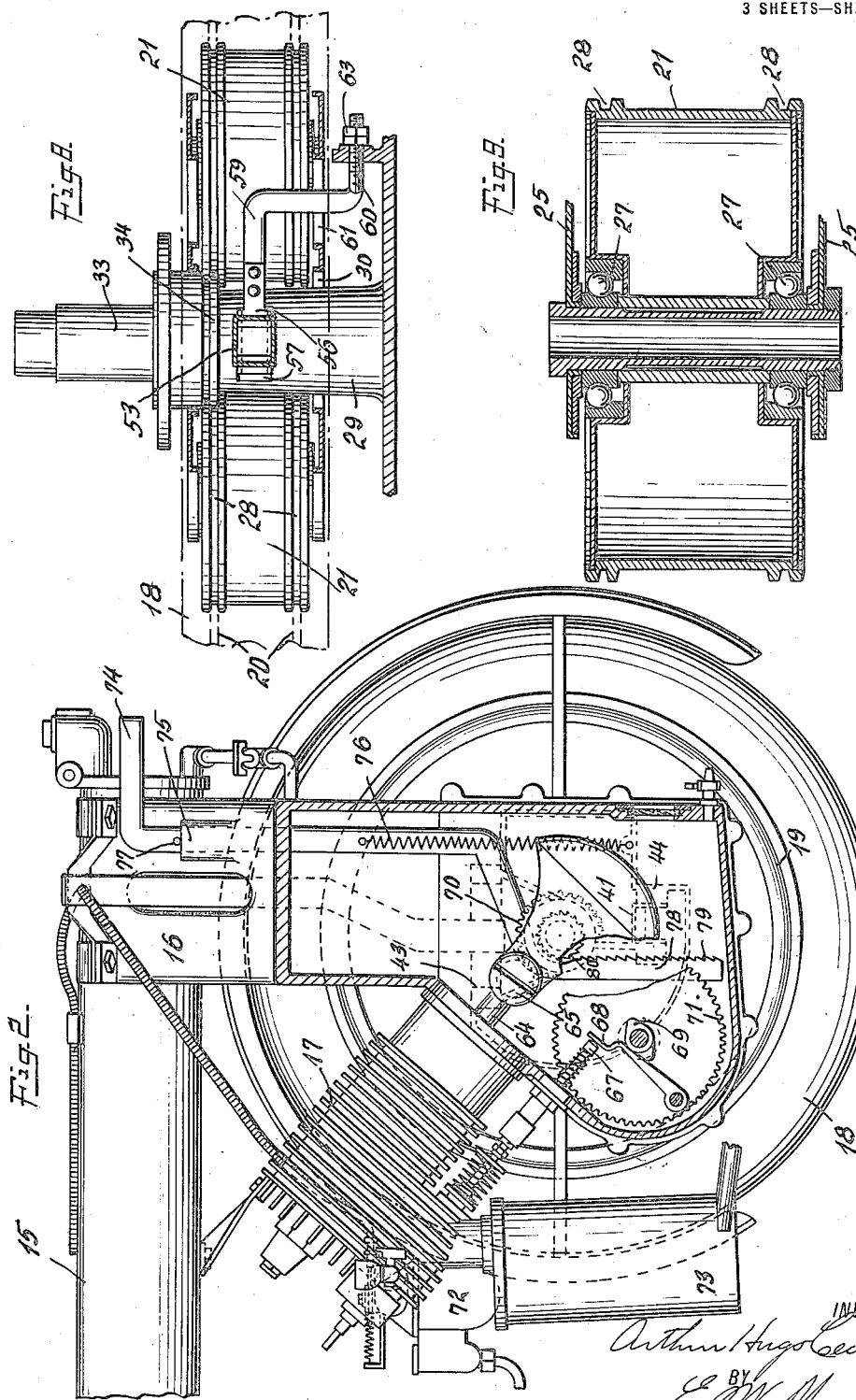
INVENTOR
Arthur Hugo Cecil Gibson
BY
E. W. Marshall
ATTORNEY

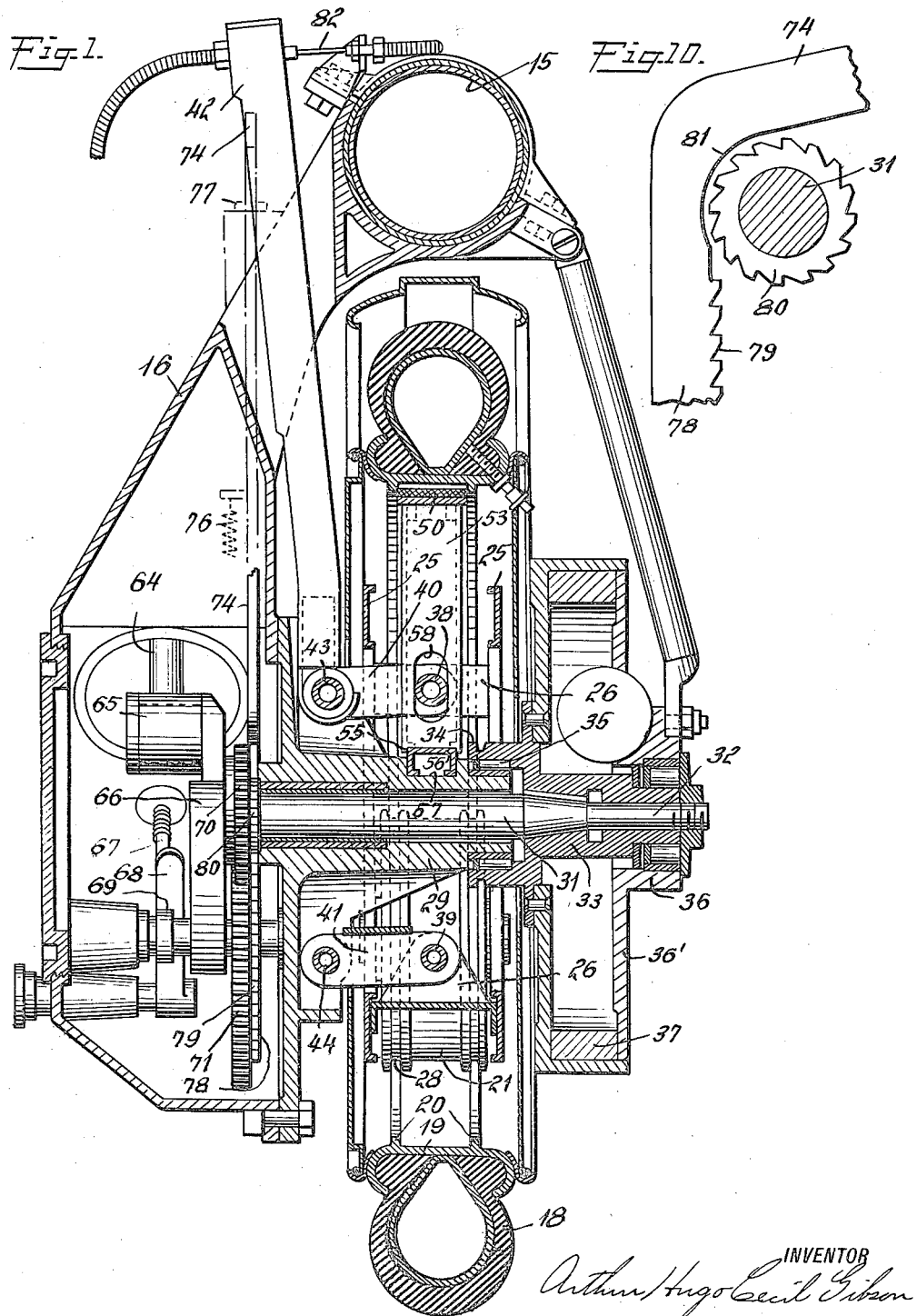

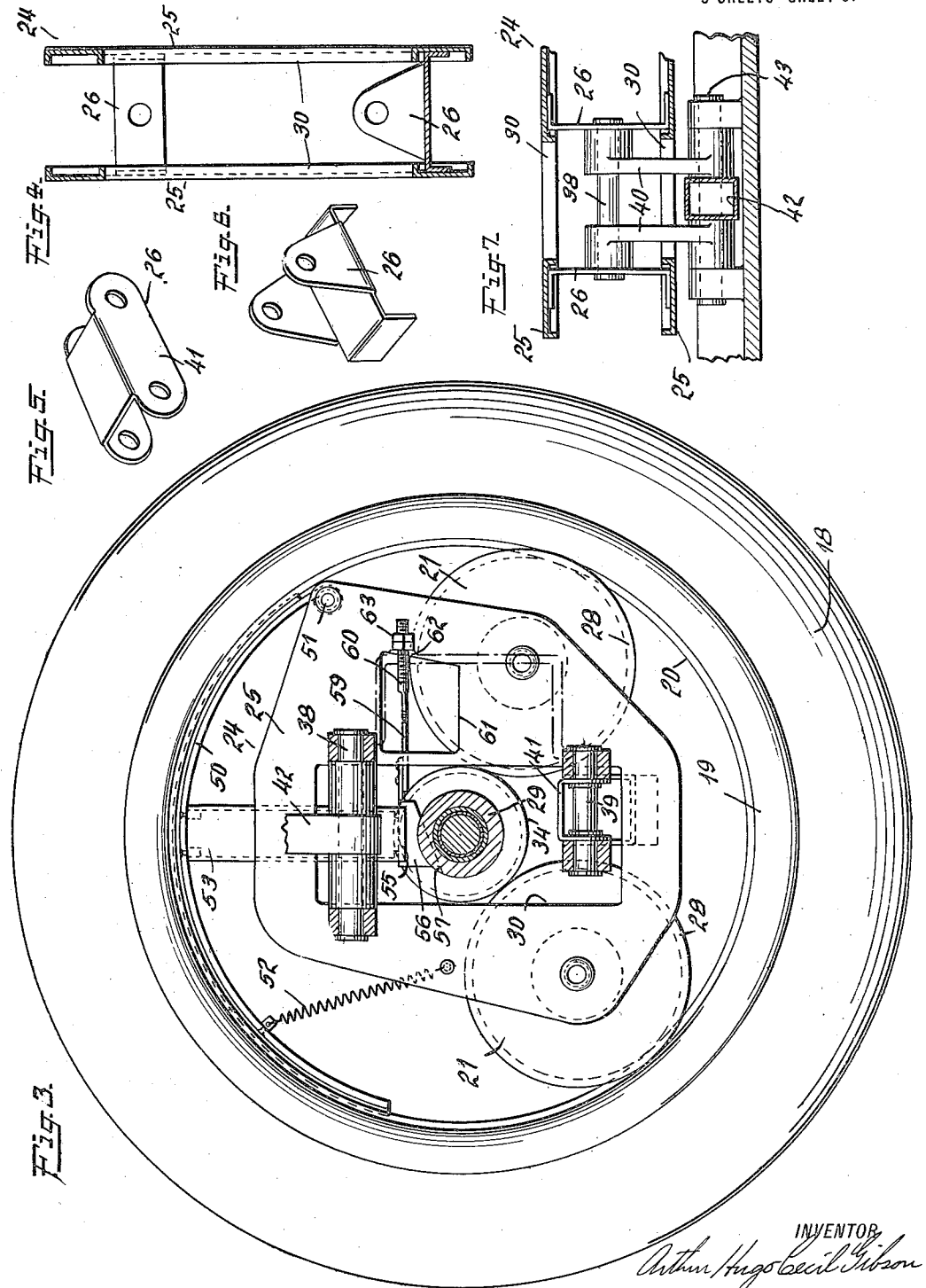

UNITED STATES PATENT OFFICE.

ARTHUR HUGO CECIL GIBSON, OF NEW YORK, N. Y., ASSIGNOR, BY MESNE ASSIGNMENTS, TO THE GIBSON MON-AUTO COMPANY, OF NEW YORK, N. Y., A CORPORATION OF NEW JERSEY.

POWER-TRANSMISSION MECHANISM.

1,293,641.   Specification of Letters Patent.   Patented Feb. 4, 1919.

Application filed December 27, 1916. Serial No. 139,161.

*To all whom it may concern:*

Be it known that I, ARTHUR HUGO CECIL GIBSON, a subject of the King of England, residing at New York, county and State of New York, United States of America, have invented certain new and useful Improvements in Power-Transmission Mechanism, of which the following is a specification, reference being had to the accompanying drawings, forming a part thereof.

My invention relates to power transmission and has special reference to the transmission of power from the engine to the driving wheel of a motor vehicle.

In my copending application Serial No. 13,792 I have shown and described a small readily portable motor vehicle, and my present invention is well adapted for use in a vehicle of this kind and is illustrated in this connection, although it is by no means restricted to any particular field of usefulness.

One object of my invention is to provide a particularly simple and compact power transmission mechanism so arranged that the weight of the motor assists in increasing the capacity of the mechanism.

Another object is to provide a mechanism of the aforesaid character in which a driving element may be very readily disengaged from the transmission elements with which it coöperates, for the purpose of permitting the engine to run free.

In order that my invention may be thoroughly understood I will now proceed to describe the same in the following specification, and then point out the novel features thereof in appended claims.

Referring to the drawings:

Figure 1 is a sectional elevation looking from the rear of a motor vehicle embodying the transmission mechanism of my invention.

A portion of the same vehicle is shown in partly sectional elevation in Fig. 2. The parts are here viewed from the side of the vehicle.

Fig. 3 is an elevation of the driving wheel showing the transmission elements more in detail.

Figs. 4, 5, 6 and 7 are detail views showing the structure of the supporting member for the transmission elements and for the brake mechanism which forms a part of my invention.

The transmission elements themselves are shown in their coöperative relation in Fig. 8 and one of them is shown in sectional detail on a larger scale in Fig. 9.

Fig. 10 is a detail view showing the starting lever on a relatively large scale.

In the drawings, 15 designates the tubular body of the vehicle and 16 a downwardly extending section which also constitutes the crank casing of the engine 17.

18 designates the driving wheel having a rim 19 formed internally with a pair of annular ribs 20 of wedge-shaped section. This ribbed inner surface of the rim constitutes a race with which a pair of transmission rollers 21 coöperate. As clearly shown in Fig. 3 these rollers are mounted in a frame 24 composed of a pair of spaced plates 25 and webs 26. Each roller is preferably mounted on frictionless bearings 27 as indicated in Fig. 9. The frame 24 is disposed within the driving wheel as shown in Fig. 3, with the transmission rollers 21 engaging the race surface of the rim, the outer surface of each roller being provided with annular grooves 28 to coöperate with the ribs 20.

The crank casing has a hub projection 29 which extends through the driving wheel and through suitable holes 30 in frame 24. The engine crank shaft 31 is rotatively mounted within the hub 29 and extends through it from the crank case beyond the hub, providing an extension 32 to which a driving roller 33 is keyed or otherwise affixed. The driving roller is recessed to receive the end of the hub 29 as shown in Fig. 1 and is provided with an annular rib or projection 34 to coöperate with the grooves 28 in the transmission rollers 21. A roller bearing designated 35 is interposed between the hub and the roller.

The outer end of the driving roller 33 forms an enlargement of the crank shaft and is rotatively mounted in a bearing block 36 which is provided with a flange 36' and constitutes a stationary cover plate for a fly wheel 37. The fly wheel is secured to the driving roller between its transmission surface and the stationary bearing block 36.

The frame 24 is provided with a pair of pivot pins 38 and 39 to which a lever arm 40 and a link 41 are respectively connected. The arm 40 forms a part of a bell crank lever 42 which is pivoted at 43 on the crank casing. The link 41 corresponds to the arm 40 in length and is pivotally connected to the crank casing at 44. The arrangement of parts is such that the frame 24 is connected by a parallel motion connection to the crank casing and a relative movement may be produced between the crank casing and the frame by actuating the lever 42.

A brake shoe 50 which has the form of a ring segment is pivotally mounted at 51 on the frame 24 and is adapted to coöperate with the inner surface of the rim 19 between the ribs 20. A spring 52 is arranged to retract the brake shoe except when the crank casing hub 29 is elevated relative to the frame 24 when the shoe is forced upwardly into engagement with the rim surface and the brake is applied.

The movement is transmitted from the hub to the shoe by a hollow rod or bar 53 which is attached to the inner surface of the shoe near the central point of its length as shown in Fig. 3 and extends within the frame 24 between the side plates 25. It has end flanges 55 which constitute guides for a wedge 56. The hub 29 is notched as shown at 57 to receive the wedge 56 and the rod or bar has slots 58 through which the pivot pin 38 extends, the arrangement of parts being such that the position of the shoe relative to the hub may be adjusted by setting the wedge. This is accomplished by an adjusting rod 59 which has an offset screw-threaded end portion 60 which extends outwardly through a hole 61 in the frame plate 25 and extends through a boss 62. Adjusting nuts 63 are mounted on its outer end and the position of the wedge may be determined by turning the nuts.

Referring particularly to Figs. 1 and 2,—64 designates the connecting rod of the engine, 65 the crank pin, 66 the crank head which is secured to the crank shaft 31, 67 a valve rod, 68 an actuating lever therefor, and 69 a cam which oscillates the actuator 68 and is operatively connected to the crank shaft by gears 70—71.

The engine carbureter is designated 72 and the muffler 73.

The engine is provided with a starting mechanism comprising a starting lever 74, which extends through a hollow boss 75 of the crank casing and is bent laterally at its upper end to constitute a handle. The rider may conveniently grip this handle and pull upwardly on the lever which is retracted by a spring 76, its downward movement being limited by a pin or stop 77.

Within the crank casing the lever is bent to form an offset portion 78 having a serrated or rack surface 79 which is adapted to coöperate with a ratchet wheel 80. When the lever is released the ratchet wheel 80, which is secured to the crank shaft, is entirely disengaged from the toothed surface 79, being then opposite a smooth undercut surface 81 so that the motor is free to operate without any friction from the starting mechanism.

When the lever is pulled upwardly the teeth 79 engage the teeth of the ratchet wheel 80, causing the crank shaft to be rotated in a suitable direction to start the motor. The ratchet teeth and the teeth of the notched surface 79 are formed to coöperate with each other for only one direction of crank shaft rotation and consequently as soon as the motor starts the crank shaft is free to rotate.

This mechanism has the advantage that should the motor back fire the lever will only be pulled downwardly to a certain distance in order to free itself, without danger of injury to the rider. Nevertheless the arrangement is such that the rider may easily exert considerable pull which is ample to start the motor.

The operation of the transmission mechanism will be clearly understood from the foregoing description and may be outlined as follows:—Assuming that the lever 42 is released the weight of the engine and of the load which is ultimately borne by the rear wheel, is all transmitted through the crank casing, the crank shaft, the driving roller 33 and the transmission rollers 21. If, however, the lever 42 is actuated, which may be accomplished in any suitable manner, as for example by the Bowden wire designated 82, the crank casing and the driving roller, will be elevated relative to the frame 24 so that the driving roller will be disengaged from the transmission rollers 21 and the weight will be transferred through the link members 40 and 41 to the frame and thence through the rollers 21 to the wheel. The parts are so adjusted that this operation may be performed to such an extent that both the engine shaft and the vehicle wheel are free to rotate. A further upward movement of the crank casing 16 will force the brake 50 against the inner surface of the wheel rim 19. Thus an intermediate position of the crank casing relative to the frame 24 is a free running position, from which a downward movement will put the engine into driving connection with the wheel 18, and from which an upward movement will apply the brake to this wheel.

Attention is directed to the fact that when the vehicle is in operation the frictional engagement between the driving and driven rollers is enhanced in proportion to the load and consequently the heavier the load borne by the vehicle the greater the traction between the transmission elements as well as between the wheel and the roadway. It will also be observed that when the vehicle is in operation the frame 25 and the bearings for the rollers 21 are for the greater part of the time relieved of all load which is transmitted directly through the peripheries of the rollers, as already explained.

My invention is by no means restricted to the structure illustrated and in fact the transmission mechanism is adapted to a wide variety of uses. I therefore intend only such limitations as are imposed by the appended claims.

This application is a continuation in part of my copending application Serial No. 13,792 filed Mar. 11, 1915.

What I claim is:

1. A power transmission mechanism comprising a driven wheel having an annular race, a driving shaft, a driving wheel thereon, interposed transmission wheels between the driving wheels and the annular race of the driven wheel and means for adjusting the position of the driving wheel into and out of engagement with the transmission wheels.

2. A power transmission mechanism comprising a driven wheel having an annular race, a driving shaft, a driving wheel thereon, interposed transmission wheels between the driving wheels and the annular race of the driven wheel, the weight of the driving shaft and its attached parts being carried by the transmission wheels, whereby the traction between the driving and transmission wheels and between the transmission wheels and the race is enhanced.

3. A power transmission mechanism comprising a driven wheel having an annular race, a driving shaft, a driving wheel thereon, interposed transmission wheels between the driving wheels and the annular race of the driven wheel, the weight of the driving shaft and its attached parts being carried by the transmission wheels, and means for adjusting the position of the driving wheel into and out of engagement with the transmission wheels.

4. A transmission mechanism comprising a motor, a driven wheel having a race, a roller frame within the wheel, a plurality of transmission rollers mounted thereon and in engagement with the race, and means for operatively connecting and disconnecting the engine with the rollers.

5. A transmission mechanism comprising a driven wheel having a race and a roller frame within the wheel having a plurality of transmission rollers adapted to engage the race, a driving roller and means for moving the driving roller into engagement with the transmission rollers and establish an operative connection therewith.

6. A clutch and speed reduction mechanism comprising a driven wheel having an annular friction surface, a driving shaft, a friction roller, and manually controlled means for operatively connecting the roller to drive the wheel through the friction surface and for moving the roller out of operative connection with said friction surface.

7. A clutch and speed reduction mechanism comprising a driven wheel having an annular friction surface, a driving shaft, a friction driving roller, interposed friction rollers between the race and the driving roller and means for moving the driving roller out of engagement with said friction rollers.

8. A clutch and speed reduction mechanism comprising a driven wheel having an annular friction surface, a driving shaft, a friction driving roller, interposed friction rollers between the race and the driving roller, and means for adjusting the driving roller into and out of active driving position.

9. A clutch and speed reduction mechanism comprising a driven wheel having an annular friction surface, a driving shaft, a friction driving roller, interposed friction rollers between the race and the driving roller, and means for adjusting the driving roller into and out of frictional engagement with the interposed friction rollers.

10. A power transmission mechanism comprising a driven wheel thereon, a driving shaft, a driving wheel within the driven wheel, interposed transmission wheels between the driving wheel and the driven wheel, a brake adapted to coöperate with the driven wheel, means for moving the driving wheel and the brake in opposite directions to selectively bring them into action, and means for adjusting the brake relative to the driving wheel.

11. A power transmission mechanism comprising a driven wheel thereon, a driving shaft, a driving wheel within the driven wheel, interposed transmission wheels between the driving wheel and the driven wheel, a brake adapted to coöperate with the driven wheel, and means for moving the driving wheel and the brake in opposite directions to selectively bring them into action.

12. A power transmission mechanism comprising a driven wheel having an annular race surface, a driving shaft extending axially within the wheel, a driving wheel secured to the shaft, interposed transmission wheels between the driving wheel and the annular race of the driven wheel, a brake adapted to coöperate with the annular race, and means for moving the driving wheel and the brake in opposite directions to bring them selectively into action.

13. A power transmission mechanism comprising a driven wheel having an annular race surface, a brake, a driving shaft extending axially within the wheel, a driving wheel secured to the shaft, interposed transmission wheels between the driving wheel and the annular race, and means movable in one direction to set the brake and in the opposite direction to force the driving wheel into engagement with the transmission wheels.

14. A power transmission mechanism comprising a driven wheel having an annular race surface, a brake, a driving shaft extending axially within the wheel, a driving wheel secured to the shaft, interposed transmission wheels between the driving wheel and the annular race, means movable in one direction to set the brake and in the opposite direction to force the driving wheel into engagement with the transmission wheels, and means for adjusting the position of the brake relative to the driving wheel.

15. A power transmission mechanism comprising a driven wheel having an annular race surface, a driving shaft, a bearing therefor within the driven wheel, a driving wheel on said shaft, a brake operatively connected to the driving shaft bearing, and adapted to coöperate with the race surface, and means for adjusting the driving shaft bearing in one direction to effect a driving connection with the race and in the opposite direction to release the driving connection and set the brake.

16. A power transmission mechanism comprising a driven wheel having an annular race surface, a driving shaft, a bearing therefor within the driven wheel, a driving wheel on said shaft, a brake operatively connected to the driving shaft bearing and adapted to coöperate with the race surface, means for adjusting the driving shaft bearing in one direction to effect a driving connection with the race and in the opposite direction to release the driving connection and set the brake, and means for adjusting the brake relative to the driving shaft bearing.

17. A power transmission mechanism comprising a motor, a crank casing, a crank shaft, a driven wheel having an annular race, a frame surrounding the crank shaft within the wheel, links connecting the crank casing and said frame, rollers mounted in the frame and adapted to engage the race, a brake mounted on the frame and adapted to engage the race, a driving wheel on the crank shaft operatively connected to the brake, and means for adjusting the crank casing relative to the frame to move the driving roller and the brake in one direction either to release the brake or to establish a driving connection to the wheel or in the other direction to interrupt the driving connection or to set the brake.

18. A power transmission mechanism comprising a driven wheel, a motor having a shaft extending through the driven wheel, a driving roller on the shaft operatively connected to the wheel, and means for adjusting the motor and the driving shaft relative to the driven wheel to make and break the aforesaid operative connection.

19. A power transmission mechanism comprising a driven wheel having a roller race, a motor having a frame, a supporting bracket within the driven wheel, transmission rollers therein coöperating with the roller race, a motor shaft extending through the driven wheel, a driving roller thereon adapted to coöperate with the transmission rollers and means for adjusting the motor and the driving shaft relative to the wheel and the supporting frame for the transmission rollers.

20. A power transmission mechanism comprising a driven wheel, a driving shaft extending through the wheel, a motor and a fly wheel on opposite sides of the wheel connected to the driving shaft and supported thereby, a driving wheel on the shaft and a friction drive connection between the driving wheel and the driven wheel so arranged that the weight of the motor and fly wheel force the coöperating elements into engagement.

21. A power transmission mechanism comprising a driven wheel, a driving shaft extending through the wheel, a motor and a fly wheel on opposite sides of the wheel connected to the driving shaft and supported thereby, a driving wheel on the shaft and a friction drive connection between the driving wheel and the driven wheel so arranged that the weight of the motor and fly wheel force the coöperating elements into engagement, and means for lifting the driving shaft and connected parts to disconnect the driving wheel from the driven wheel.

22. A driven wheel having an annular race, a driving shaft, a motor connected to the shaft and interposed friction drive rollers between the driving shaft and the race, arranged to support the weight of the shaft and the motor.

23. A power transmission mechanism comprising a driven wheel, a driving shaft, a driving wheel thereon within the driven wheel, interposed transmission wheels between the driving wheel and the driven wheel, a brake, and means for oppositely moving the driving wheel and the brake to selectively bring said driving wheel or said brake into action.

24. A power transmission mechanism comprising a driven wheel having an annular race surface, a driving shaft extending axially within the wheel, a driving wheel secured to the shaft, interposed transmission wheels between the driving wheel and the annular race of the driven wheel, a brake for the mechanism, and means for moving the driving wheel and the brake in opposite directions to bring said driving wheel or said brake into action.

25. A power transmission mechanism comprising a driven wheel having an annular race surface, a driving shaft, a bearing therefor within the driven wheel, a brake operatively connected to the driving shaft bearing, and means for adjusting the driving shaft bearing in one direction to effect a driving connection with the race and in the opposite direction to release the driving connection and set the brake.

26. A power transmission mechanism comprising a motor, a crank casing, a crank shaft, a driven wheel having an annular race, a frame loosely surrounding the crank shaft within the wheel, links connecting the crank casing and said frame, rollers mounted in the frame and adapted to engage the race, a driving wheel on the crank shaft, and means for adjusting the crank casing relative to the frame.

27. A power transmission mechanism comprising a motor frame, a roller frame hinge connected thereto, transmission rollers supported by the roller frame, a driven wheel having a race with which the transmission rollers coöperate, a driving roller operatively connected to the motor and arranged to engage the transmission rollers, and means for producing a relative movement between the motor frame and the roller frame to move the driving roller into and out of engagement with the transmission rollers.

28. A power transmission mechanism comprising a motor frame, a roller frame hinge-connected thereto, friction rollers rotatively attached to said roller frame, a driven wheel surrounding the roller frame and having a race coöperating with the transmission rollers, a driving roller operatively connected to the motor arranged to engage the friction rollers, and means for producing a relative movement between the motor frame and the roller frame.

29. A power transmission mechanism comprising a motor frame, a roller frame, parallel links connecting the roller frame to the motor frame, an actuating arm connected to one of the links for producing a relative movement between the frames, a plurality of transmission rollers mounted in the roller frame, a driving wheel secured to the motor shaft within the roller frame and adapted to engage the transmission rollers.

30. A power transmission mechanism comprising a motor frame, a roller frame, parallel links connecting the roller frame to the motor frame, an actuating arm connected to one of the links for producing a relative movement between the frames, a plurality of transmission rollers mounted in the roller frame, a driving wheel secured to the motor shaft within the roller frame and adapted to engage the transmission rollers, and a brake adapted to be actuated by a relative movement between the motor frame and the roller frame.

31. A power transmission mechanism comprising a motor frame, a roller frame, parallel links connecting the roller frame to the motor frame, an actuating arm connected to one of the links for producing a relative movement between the frames, a plurality of transmission rollers mounted in the roller frame, a driven wheel having an annular race upon which said transmission rollers rest and whereby said frames are supported, and a driving wheel secured to the motor shaft within the roller frame, said driving wheel being arranged to be moved into and out of engagement with and from the transmission rollers by said relative movement between the frames.

32. A power transmission mechanism comprising a motor frame, a roller frame, parallel links connecting the roller frame to the motor frame, an actuating arm connected to one of the links for producing a relative movement between the frames, a plurality of transmission rollers mounted in the roller frame, a driven wheel having an annular race upon which said transmission rollers rest and whereby said frames are supported, and a driving wheel secured to the motor shaft within the roller frame, a brake connected with both of said frames, said driving wheel being arranged to be moved into engagement with the transmission rollers by the relative movement between the frames in one direction, and said brake being arranged to be moved into engagement with the driven wheel by the relative movement between the frames in the opposite direction.

In witness whereof I have hereunto set my hand this 22 day of December, 1916.

ARTHUR HUGO CECIL GIBSON.